(12) United States Patent
Tekletsadik (10) Patent No.: US 7,333,309 B2
(45) Date of Patent: Feb. 19, 2008

(54) SELF FIELD TRIGGERED SUPERCONDUCTING FAULT CURRENT LIMITER

(75) Inventor: Kasegn D. Tekletsadik, Rexford, NY (US)

(73) Assignee: SuperPower, Inc

( * ) Notice: Subject to any disclaimer, the term of this patent is extended or adjusted under 35 U.S.C. 154(b) by 0 days.

(21) Appl. No.: 11/436,869

(22) Filed: May 18, 2006

(65) Prior Publication Data
US 2006/0279388 A1  Dec. 14, 2006

Related U.S. Application Data

(60) Provisional application No. 60/686,764, filed on Jun. 2, 2005.

(51) Int. Cl.
*H02H 7/00* (2006.01)
(52) U.S. Cl. .......................... 361/19; 335/216
(58) Field of Classification Search ................ 361/19; 335/216
See application file for complete search history.

(56) References Cited

U.S. PATENT DOCUMENTS

| | | | |
|---|---|---|---|
| 5,361,055 A * | 11/1994 | Peck | 335/216 |
| 6,043,731 A | 3/2000 | McDougall et al. | |
| 6,137,388 A | 10/2000 | Saravolac | |
| 6,664,875 B2 | 12/2003 | Yuan et al. | |
| 6,809,910 B1 | 10/2004 | Yuan et al. | |
| 2005/0099253 A1 | 5/2005 | Bock et al. | |

* cited by examiner

Primary Examiner—Robert L. Deberadinis
Assistant Examiner—Tien Mai
(74) Attorney, Agent, or Firm—George L. Rideout, Jr.

(57) ABSTRACT

A superconducting fault current limiter array with a plurality of superconductor elements arranged in a meandering array having an even number of supconductors parallel to each other and arranged in a plane that is parallel to an odd number of the plurality of superconductors, where the odd number of supconductors are parallel to each other and arranged in a plane that is parallel to the even number of the plurality of superconductors, when viewed from a top view. The even number of superconductors are coupled at the upper end to the upper end of the odd number of superconductors. A plurality of lower shunt coils each coupled to the lower end of each of the even number of superconductors and a plurality of upper shunt coils each coupled to the upper end of each of the odd number of superconductors so as to generate a generally orthoganal uniform magnetic field during quenching using only the magenetic field generated by the superconductors.

18 Claims, 7 Drawing Sheets

SELF FIELD TRIGGERED SUPERCONDUCTING FAULT CURRENT LIMITER

CROSS REFERENCE TO RELATED APPLICATIONS

This U.S. non-provisional application claims the benefit of U.S. provisional Patent Application, Ser. No. 60/686,764, entitled "Self Field Triggered Superconducting Fault Current Limiter," filed on Jun. 02, 2005, having at least one co-inventor in common with this application.

The U.S. government has a paid-up license in this invention and the right in limited circumstances to require to the patent owner to license others on reasonable terms as provided for in the terms of Contract No. DE-FC36-03GO13033 awarded by the Department of Energy.

BACKGROUND

The invention relates generally to a current limiter and more specifically to a superconducting fault current limiter.

Current limiting devices are critical in electric power transmission and distribution systems. For various reasons such as lightening strikes, short circuit conditions can develop in various sections of a power grid causing sharp surge in current. If this surge of current, which is often referred to as fault current, exceeds the protective capabilities of the switchgear equipment deployed throughout the grid system, it could cause catastrophic damage to the grid equipment and customer loads that are connected to the system.

Superconductors, especially high-temperature superconducting (HTS) materials, are well suited for use in a current limiting device because of their intrinsic properties that can be manipulated to achieve the effect of "variable impedance" under certain operating conditions. A superconductor, when operated within a certain temperature and external magnetic field range (i.e., the "critical temperature" ($T_c$) and "critical magnetic field" ($H_c$) range), exhibits no electrical resistance if the current flowing through it is below a certain threshold (i.e., the "critical current level" ($J_c$)), and is therefore said to be in a "superconducting state." However, if the current exceeds this critical current level the superconductor will undergo a transition from its superconducting state to a "normal resistive state." This transition of a superconductor from its superconducting state to a normal resistive state is termed "quenching." Quenching can occur if any one or any combination of the three factors, namely the operating temperature, external magnetic field or current level, exceeds their corresponding critical level. Mechanisms, using any one or any combination of these three factors, to induce and/or force a superconductor to quench is usually referred to as a trigger mechanism.

A superconductor, once quenched, can be brought back to its superconducting state by changing the operating environment to within the boundary of its critical current, critical temperature and critical magnetic field range, provided that no thermal or structural damage was done during the quenching of the superconductor. HTS material can operate near the liquid nitrogen temperature 77 degrees Kelvin (77K) as compared with low-temperature superconducting (LTS) material that operates near liquid helium temperature (4K). Manipulating properties of HTS material is much easier because of its higher and broader operating temperature range.

For some HTS materials, such as BSCCO, YBCO, or $MgB_2$ elements, there often exists within the volume of the superconductor, non-uniform regions resulting from the manufacturing process. Such non-uniform regions can develop into the so-called "hot spots" during the surge of current that exceeds the critical current level of the superconductor. Essentially, at the initial stage of quenching by the current, some regions of the superconductor volume become resistive before others do due to non-uniformity. A resistive region will generate heat from its associated $i^2r$ loss. If the heat generated could not be propagated to its surrounding regions and environment quickly enough, the localized heating will damage the superconductor and could lead to the breakdown (burn-out) of the entire superconductor element.

A magnetic field is used to trigger HTS materials to improve speed and uniform quenching during transition from superconducting to normal resistive state. In some Superconducting Fault Current Limiter (SCFCL) designs, external windings (coils) are used to generate the trigger magnetic field.

US Publication US2005/0099253A1, published on May 12, 2005, discloses a superconducting current limiting device comprising a superconductor body electrically connected in parallel with a shunt coil wherein the shunt coil is in tight contact with the external surface of the superconducting body. The shunt coil has an external shape to allow a circular current to flow. This publication does not disclose or teach the elimination of the external shunt coil to use other means for generating a magnetic field to assist in quenching.

U.S. Pat. No. 6,043,731, issued on Mar. 28, 2000, discloses a current limiting device having a superconductor, a shunt coil wrapped around the superconductor and connected in parallel with the superconductor, wherein the shunt coil generates a magnetic field to assist in quenching the superconductor. The shunt coil is controlled by active means. This patent does not disclose or teach the elimination of the external shunt coil to use other means for generating a magnetic field to assist in quenching.

As the need for higher power and higher voltage applications of fault current limiters increases, designing a device with less complexity and still using magnetic field for triggering becomes a challenge. Optimizing the fault current limiter design with fewer magnetic field generating components, or even better, fewer overall components, is important to design a reliable high voltage device at a transmission system level.

Since the discovery of the high temperature superconductors, various forms and types of SCFCL designs, such as inductive and resistive fault current limiters, have been reported. There are also various types of trigger mechanisms used in order to improve the speed and uniformity of the quenching process of the superconducting materials. In most such techniques, external means such as external magnetic field, coupling magnetic circuits or transformers, and active switching circuits based on power electronics, have been used. U.S. Pat. No. 6,137,388, entitled, Resistive Superconducting Current Limiter and U.S. Pat. No. 6,664,875, entitled, Matrix-Type Superconducting Fault Current Limiter, use external magnetic circuits to generate the triggering magnetic field. Scaling these designs to higher voltage and higher power applications remains a challenge, especially at the 138 kV or higher transmission voltage levels. In most cases the high voltage design is considered the most challenging aspect of the transmission system SCFCL development.

As the power and voltage requirement increases, the number of components (superconductors and magnetic field coils) increase, which adds to the complexity of the device. Reducing the number of parts is one of the ways to improve reliability of the device.

For the reasons described above there is therefore a need for a simplified design and to improve reliability of the SCFCL device for transmission system applications in higher voltage applications.

BRIEF DESCRIPTION

Briefly, in accordance with one embodiment of the present invention, a superconducting fault current limiter array has a plurality of superconductor elements arranged in a meandering array that has the respective shape of a circle, ellipse, or a rectangle. The meandering array has an even number of superconductors substantially parallel to each other and arranged in a plane that is generally parallel to an odd number of superconductors, where the odd number of superconductors are substantially parallel to each other and arranged in a plane that is generally parallel to the even number of superconductors, when viewed from a top view. The even number of superconductors are coupled at the upper end to the upper end of said odd number of superconductors. A plurality of lower shunt coils each coupled to the lower end of each of the even number of superconductor elements and a plurality of upper shunt coils each coupled to the upper end of each of the odd number of superconductor elements so as to generate a generally orthogonal uniform magnetic field using only the magnetic field generated by the superconductors that also help the superconductors to quench uniformly and quickly.

Using the fault current limiter array as a base module, a series array superconducting fault current limiter is configured to have at least two modules, wherein each module electrically coupled in series with each other module. The modular nature of the superconducting fault current limiter makes it very desirable in high voltage and/or high current environments of the power system to which it connects.

In accordance with another embodiment of the present invention, a fault current limiter array, has a plurality of superconductors each superconductor having upper and lower ends, a plurality of upper and lower shunt coils, wherein the plurality of superconductors is arranged in a line, having superconductors parallel to each other and arranged in adjacent pairs, a plurality of upper shunt coils each coil electrically coupled to every other pair of superconductors at a respective upper end. The lower end of the other pairs of superconductors is electrically coupled together and a plurality of lower shunt coils each coil electrically coupled to every other pair of superconductors at a respective lower end, wherein the upper end of every other pair of superconductors is electrically coupled together. The line of superconducting element are disposed substantially parallel to each other in a plane so that the electromagnetic force generated by each superconductor magnetic field is minimized and does not introduce mechanical stress on the respective individual superconductor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

This invention provides an approach to generate the magnetic field from the HTS elements themselves. This invention also employs shunt coils to protect HTS elements from uncontrolled energy input during fault limiting conditions. The shunt coils also help to reduce the effect of statistical variations of HTS elements.

U.S. Pat. No. 6,809,910, entitled "Method and Apparatus To Trigger Superconductors In Current Limiting Devices", issued on Oct. 26, 2004, assigned to the assignee of the present invention, is herein incorporated by reference in its entirety. This patent describes a FCL having a shunt and a trigger coil and provides details about the trigger coils and the triggering method and mechanism.

The superconducting fault current limiter (SCFCL) array uses a magnetic field generated by the superconductor elements for self triggering. This approach eliminates the need for external magnetic field generating coils or windings and makes the design of SCFCL less complex. Superconducting elements, including rods, tubes, tapes or wires made of single superconductor elements or multiple superconductor elements connected in series or parallel, arranged in a way to form a rectangular, oval or circular winding and produce a net magnetic field common to all elements. During normal operation, the design has low magnetic field and low inductive/resistive impedance. During a fault condition, the magnetic field will be high enough to influence the critical current density of the superconductor material and help to quench uniformly and quickly. The arrangement provides a net magnetic field higher than the self field of each superconductor element, which provides a design as simple as a series resistive SCFCL with an added advantage of having a trigger magnetic field.

Each superconductor element is protected against excessive energy dump by a shunt impedance. The shunt impedance protects a single superconductor element or staggered superconductor elements to protect multiple elements. Using such a configuration, one shunt coil at the associated impedance protects multiple elements and help to improve the protection system and further reduces the statistical variation of quenching speed and voltage development among superconductor elements.

Figure 1:
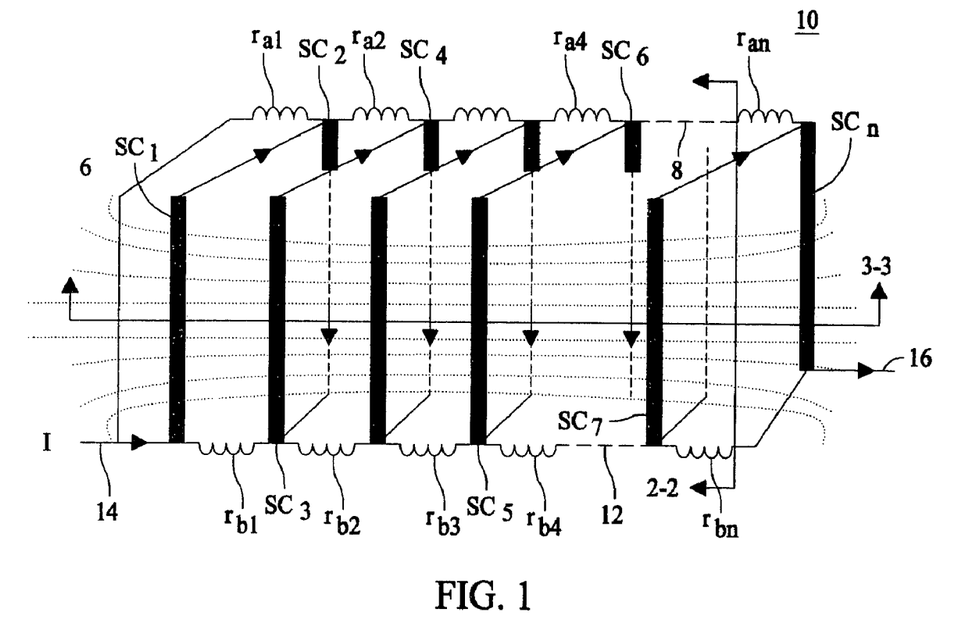
FIG. 1 illustrates a simplified physical component layout of a basic self field triggered fault current limiter of the present invention.
Figure 2:
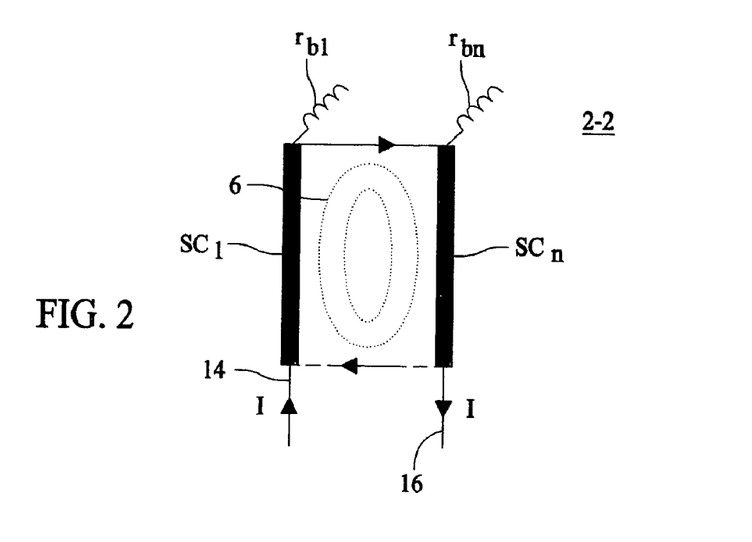
FIG. 2 illustrates a side view from plane 2-2 of FIG. 1 of the self field triggered fault current limiter of the present invention.
Figure 3:
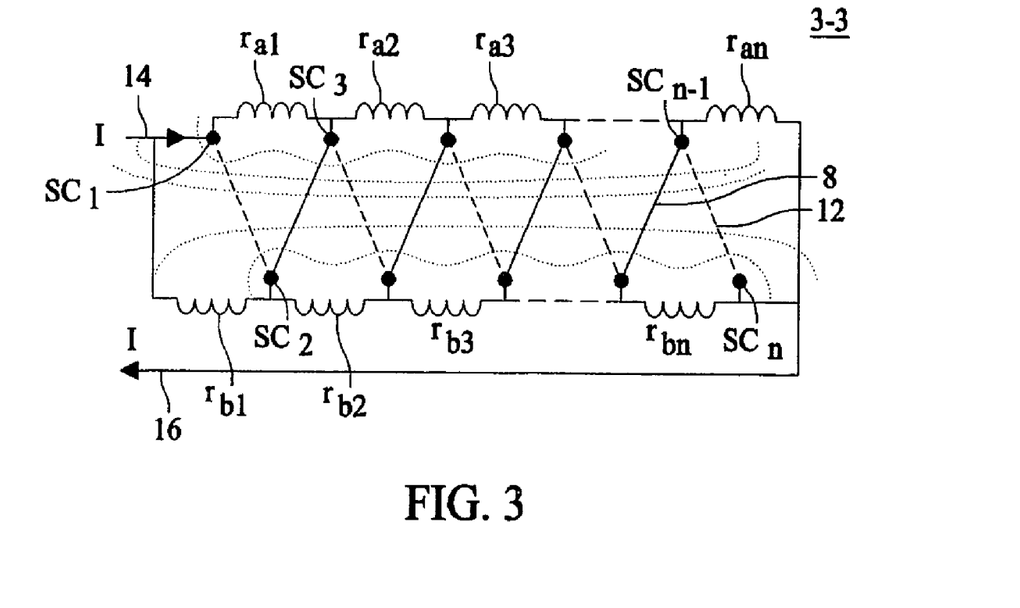
FIG. 3 illustrates an top view from plane 3-3 of FIG. 1 of the self field triggered fault current limiter of the present invention.
Figure 4:
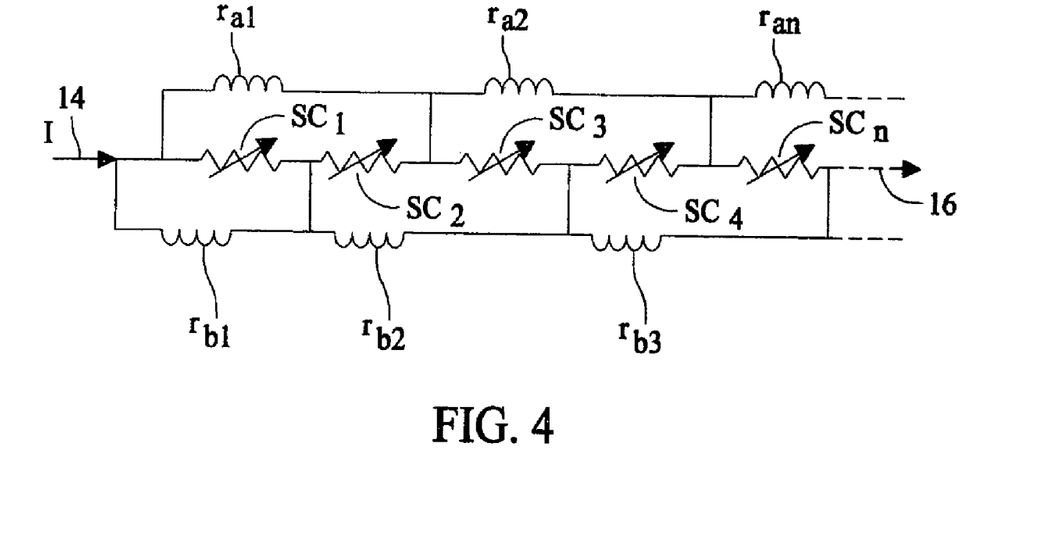
FIG. 4 illustrates an equivalent electrical schematic circuit of the self field triggered fault current limiter of the present invention.
Figure 12:
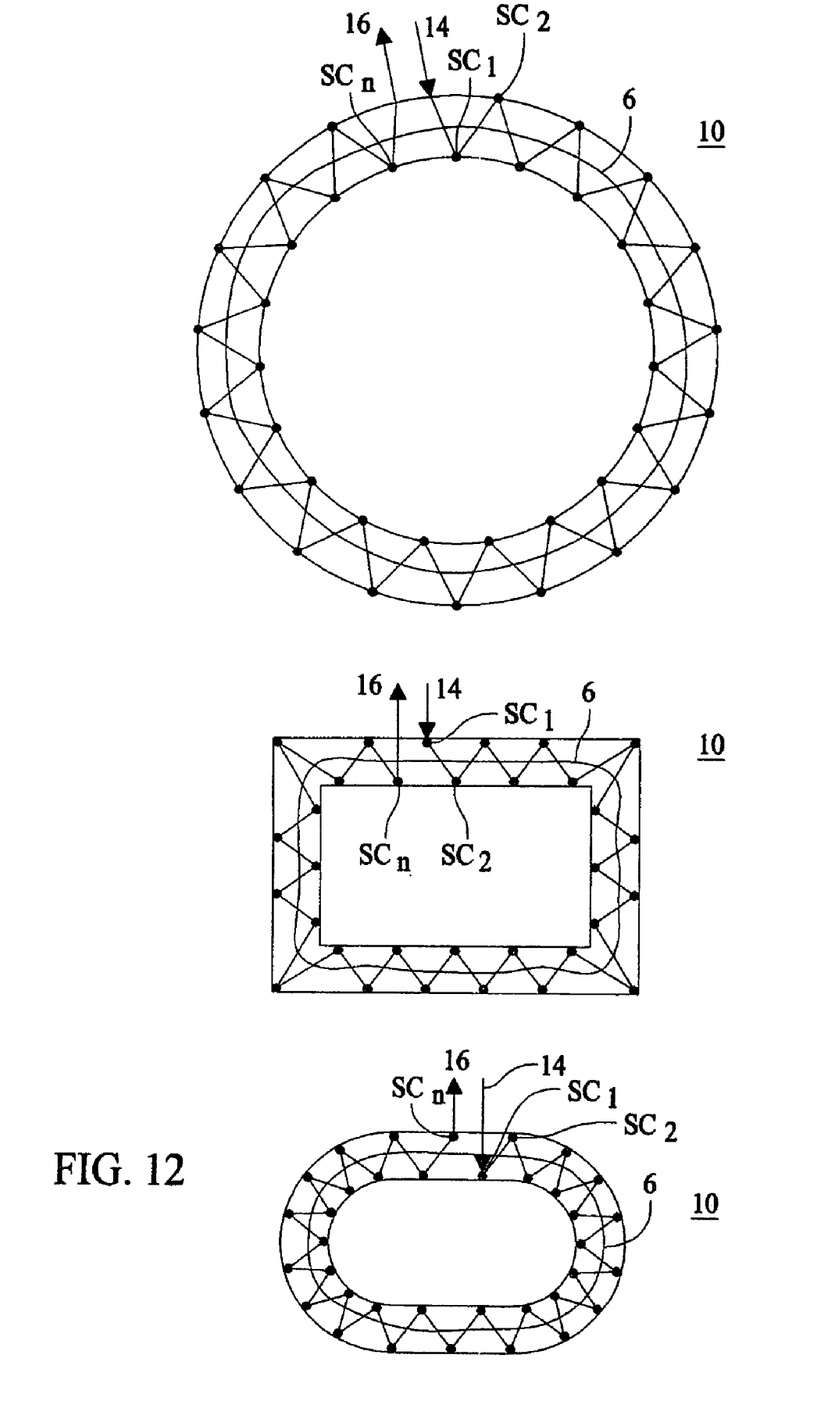
FIG. 12 illustrates alternative embodiments of the top view from plane 3-3 of FIG. 1, of the self field fault current limiter of the present invention.

FIG. 1 illustrates the fault current limiter array 10 of the present invention and is arranged to form a rectangular, oval or circular winding to produce a net magnetic field 6 common to all superconductor elements. Fault current limiter 10, has a plurality of superconductor elements $sc_1$ to $sc_n$ disposed in a "meandering" arrangement. FIG. 3, as viewed from the top defined by cross hatch 3-3, illustrates the arrangement of the superconductors $sc_1$ to $sc_n$. Each superconductor is arranged in a zigzag wherein an even number of superconductors $sc_2$, $sc_4$, $sc_{n-1}$, are substantially parallel to each other and disposed in a plane that is generally parallel to the odd number of superconductors $sc_1$, $sc_3$, ... $sc_n$, wherein the odd number of superconductors are substantially parallel to each other also. A plurality of odd shunt coils $r_{a1}$ to $r_{an}$ are electrically connected to the upper end of the odd number of superconductors. A plurality of even shunt coils $r_{b1}$ to $r_{bn}$ are electrically connected to the even number of superconductors. Current "I" 14 flows into the array at the end of superconductor $sc_1$ and out current "I" 16 of the array at the end of superconductor $sc_n$. Cross hatch 2-2 is a cross section of array 10, as viewed from either side, and is illustrated in FIG. 2. Although FIG. 3 shows meandering array 10 that is generally arranged in a straight line, it is understood that this line merely illustrates a portion of a much larger meandering array 10 made of single superconductor elements or multiple superconductor elements connected in series or parallel, arranged in a way to form a rectangular, elliptical or circular winding and produce a net magnetic field common to all elements, as illustrated in FIG. 12.

During normal operation, the superconductors $sc_1 \ldots sc_n$ all have low magnetic field and low impedance. During a fault condition, the magnetic field 6 is high enough to influence the critical current density of the superconductor material and help the superconductor quench uniformly and quickly. The arrangement provides a net magnetic field higher than the self field of each superconductor element, which provides a design as simple as a series resistive fault current limiter with an added advantage of having a trigger magnetic field.

Each superconductor element $sc_1 \ldots sc_n$ is protected against excessive energy dump by shunt impedance $r_{a1-an}$ and $r_{b1-bn}$. The shunt impedance protects an associated single superconductor element sc or staggered superconductors to protect multiple elements. Using this configuration, the impedance of one shunt coil protects multiple superconductor elements and helps to improve the protection system and reduces the statistical variation of quenching speed and voltage development among superconductor elements.

Figure 5:
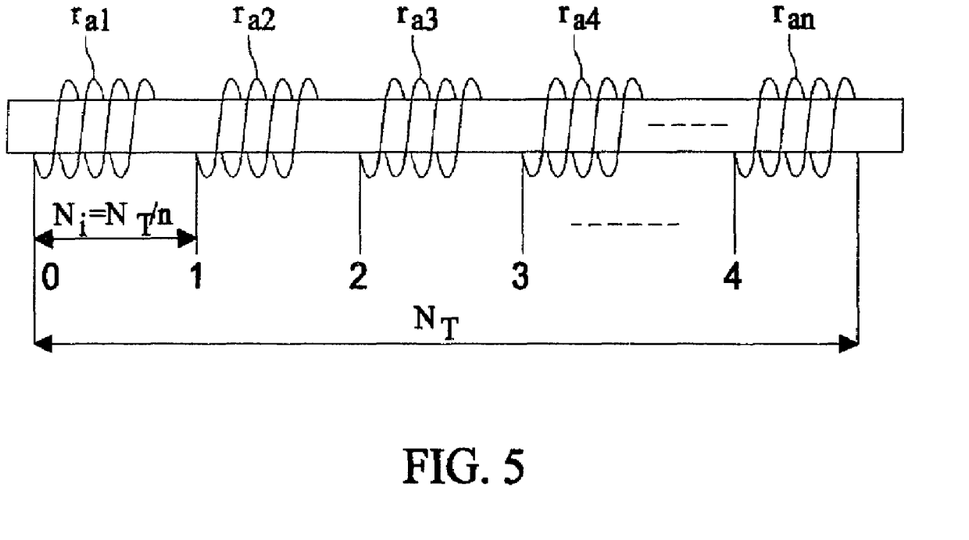
FIG. 5 illustrates multiple shunt coils on a single former having tapped windings of the present invention.

FIG. 5 shows the design of the shunt coil impedance $r_{a1-an}$ or $r_{b1-bn}$ respectively. The two groups of shunt coils shown in FIG. 1, may be produced with two single formers with a shunt impedance between conductors taken from tapped terminals. The respective shunt coils $r_{a1 \ldots an}$ or $r_{b1 \ldots bn}$ can be a single or multi-layer windings wound on formers of circular, rectangular, elliptical or a combination of these shapes convenient for the design of the required impedance. Using a single former for half of the shunt coils per module, reduces the number of individual shunt coils to be wound and also improves the electrical and mechanical designs.

Figure 6:
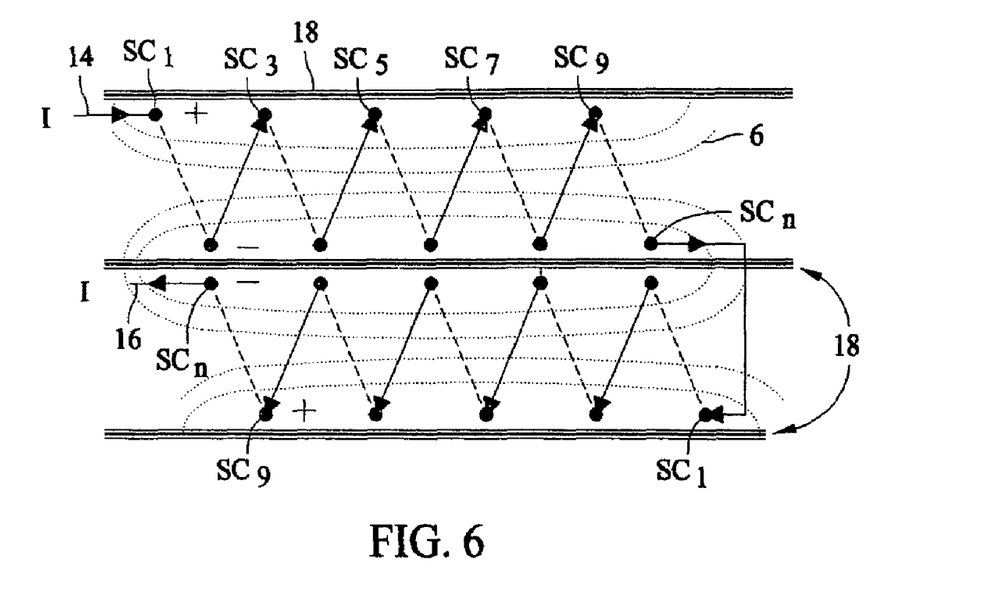
FIG. 6 illustrates modules arranged to produce a low magnetic field between sections of the present invention.
Figure 7:
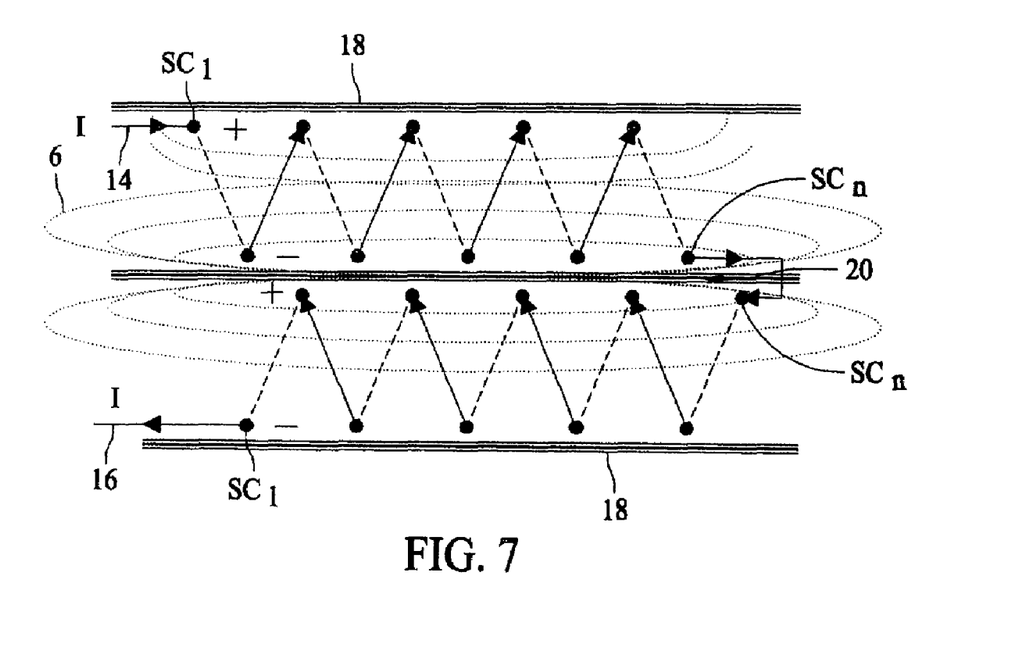
FIG. 7 illustrates modules arranged to produce high magnetic field between sections of the present invention.

Assuming that "n" number of shunt coils "r" constructed from a total of $N_T$ Number of turns, the inductance $(L_i)$ of a single shunt coil "r" with a single former of length, "$l_t$", and diameter, "D", is given as;

$$L_i = \frac{\mu_0 \pi D^2 N_T^2}{4n\sqrt{D^2 + l_t^2}} \cong \frac{\mu_0 \pi D^2 N_T^2}{4nl_t} H$$

for n multiple coils on a single former when using superconductors that are sensitive to the orientation (direction) of the magnetic field, the design and arrangement of the superconductor elements sc and shunt coils $r_a$ and $r_b$ will have to take into account both the magnitude and direction of the magnetic field. Such sections or modules with superconductor elements and shunt coils can be arranged or placed with another section to enhance the magnetic field and also to improve uniformity of the magnetic field. FIGS. 6 and 7 shows how such SCFCL arrays or modules are arranged to employ magnetic field 6 arrangements to generate regions between modules that have a low 18 or high 20 magnetic field. In this case, the fault current limiter response time and quenching performance will have to be selected based on the sensitivity of the HTS material to the magnetic field orientation, either in parallel or perpendicular to the HTS.

FIG. 6 shows an example of assembly from modules. Note that shunt coils, which are not shown in FIG. 6 are still part of the system. Depending on the applications and the required magnetic field level, the field region between sections or modules can be low 18 as illustrated in FIG. 6 or high 20 as illustrated in FIG. 7. Such flexibility will give more freedom in selecting arrays to withstand mechanical stresses from the short circuit forces. FIG. 6 and FIG. 7 show how such sections or modules are connected in series in order to configure for low or high magnetic field designs. In FIG. 6 current "I" 14 enters at $sc_1$ and exits $sc_n$ of a first array and is electrically coupled to $sc_1$ of a second array. The current "I" 16 exits the second array at $sc_n$. Because of the arrangement of respective meandering arrays the resulting magnetic field of the arrays is subtractive. In FIG. 7 current "I" 14 enters at $sc_1$ and exits at $sc_n$ of a first array which is electrically coupled to $sc_n$ of a second array. The current "I" 16 exits the second array at $sc_1$. Because of the arrangement of respective meandering arrays the resulting magnetic field of the arrays is additive. Multiple sections or modules can also be connected in series or in parallel or in a combination of series and parallel for higher voltage and higher power applications. Such an arrangement also is useful to minimize the Self and mutual inductances. A single section design minimizes the effect of electromagnetic forces by arranging superconductor elements in a form of a single coil (winding).

High voltage design consideration is also one of the primary drivers for such a simplified design concept. Reduced or no external magnetic field coils means a simple resistive network with improved uniform voltage distribution for both lightning impulse and AC applications.

When limiting a fault current much higher than the critical current density of the HTS elements, especially at high power distribution or transmission systems, the self magnetic field generated by the current through the individual HTS elements should be high enough to aid uniform and fast quenching of the HTS elements. In such operating conditions, where the need for external or common magnetic field is of minimum effect, the overall fault current limiter design can be simplified to a matrix of modules with HTS elements arranged in another type of meandering arrangement with shunt windings/impedances arranged along the HTS contact terminals, so that the magnetic field produced by the current through the HTS elements and connector terminals does not induce voltage in the shunt coils, hence eliminate or minimize the power loss in the shunt coils and reduce the overall cooling power requirements during normal operation and minimizes electromagnetic interference between main HTS current and shunt coils. Such a simplified version of the main fault current limiter, which relies on the self magnetic field of each individual HTS element is shown in FIGS. 8 to FIG. 11. This simplified version helps to reduce the overall inductance of the fault current limiter.

Figure 8:
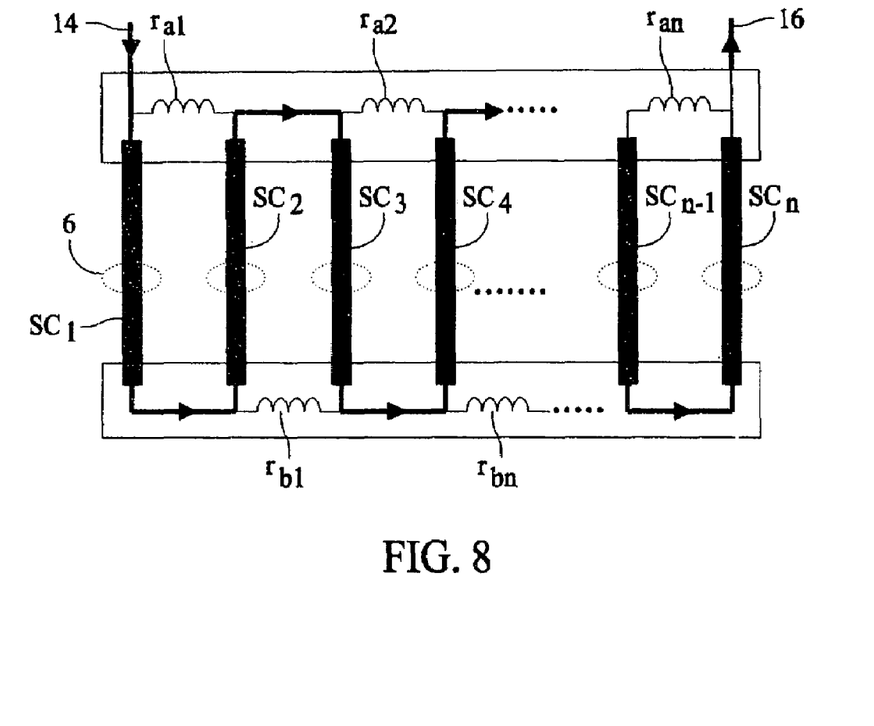
FIG. 8 illustrates a simplified self field triggered fault current limiter of the present invention.
Figure 9:
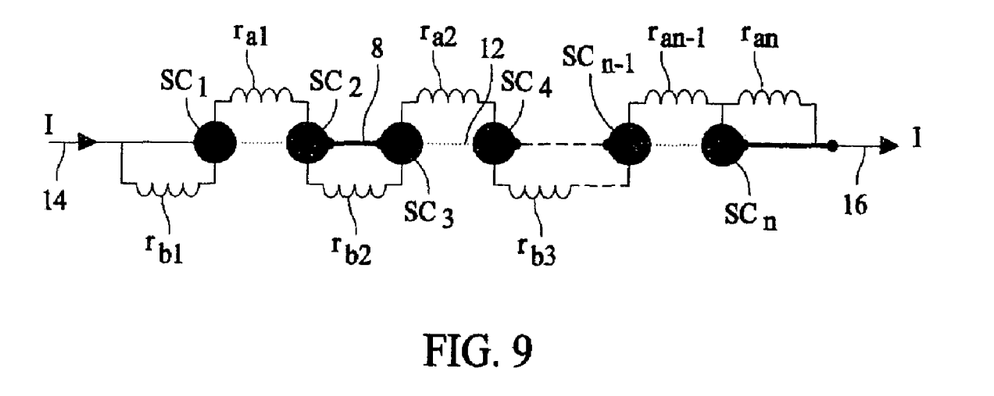
FIG. 9 illustrates a top view of FIG. 8 of the present invention.
Figure 10:
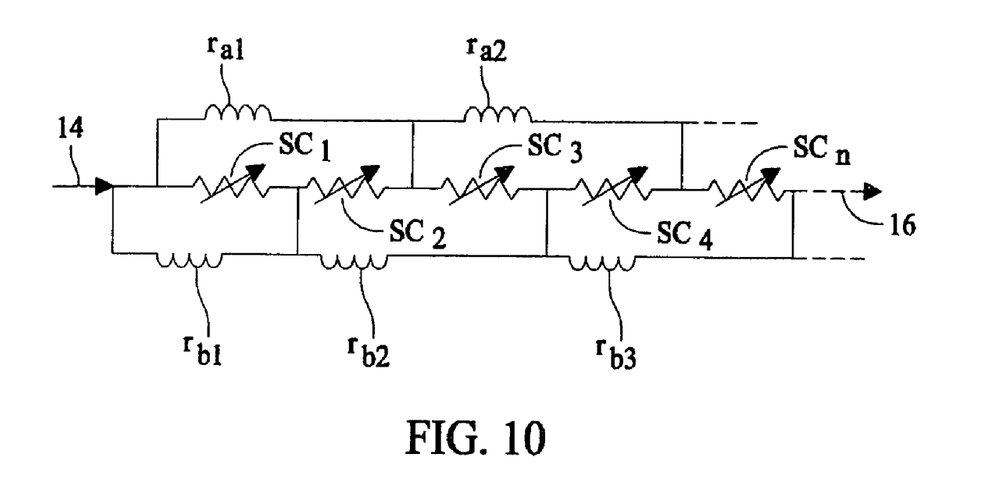
FIG. 10 illustrates an equivalent circuit of the present invention of FIG. 8 having top and bottom shunt impedances.

As shown in FIGS. 8, the design is simplified by providing one shunt coil $r_{a1}$, either connected to the top of superconductor pair $sc_1$ and $sc_2$ or bottom, for two superconducting elements and further reduce the number of components, which helps in improved manufacturability and better reliability. The adjacent superconductor pair $sc_3$ and $sc_4$ is arranged in an opposite configuration wherein the shunt coil $r_{b1}$ is connected to the opposite end as $r_{a1}$ and the other (top) end of $sc_2$ and $sc_3$ is electrically coupled together. The alternating connection approach is repeated for each of the superconductor pairs until $sc_n$ is coupled in the array, where current "I" enters at 14 and exits at 16. The line of superconducting elements $sc_1$ to $sc_n$ are disposed substantially parallel to each other in a plane so that the electromagnetic force generated by each superconductor magnetic field 6 is minimized and does not introduce mechanical stress on the respective individual superconductor. FIG. 9 illustrates the same connection arrangement as described in FIG. 8 but from a top view. FIG. 10 shows the equivalent electrical schematic of the invention in FIG. 8.

Figure 11:
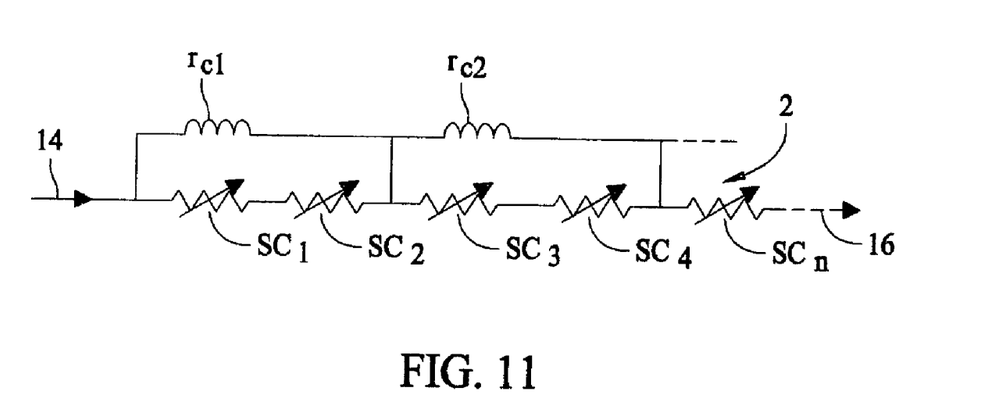
FIG. 11 illustrates an equivalent circuit of the present invention of FIG. 8 with a single side of shunt impedances.

FIG. 11 illustrates an alternative embodiment of the equivalent circuit illustrated in FIG. 10. Here a respective $r_{c1\ldots n}$ replaces the equivalent impedance of a respective $r_{a1\ldots an}$ and $r_{b1\ldots bn}$ has been eliminated.

The shunt coils $r_{a1\ldots an}$ and $r_{b1\ldots bn}$ in the present invention are made of electrically conductive materials and in configurations that are selected from the group including helically-wound solenoid coils, racetrack coils, and saddle coils wound on a rectangular or circular or oval former. The superconductors $sc_{1\ldots n}$ in either non-inductive and alternatively low-inductive form in the present invention, are selected from the group including rods, bars, plates, tape strips, wires, tubes, and bifilar coils which can be a single superconductor or multiple superconductor elements in series or parallel connections with a single or multi-layer windings.

The present invention provides for a less complex fault current limiter design in high voltage electrical power system applications. This invention uses a self magnetic field for uniform quenching and fast transition from superconducting to normal (resistive) state and yet lends itself for simplified design for high voltage, mechanical, electrical and electromagnetic design applications.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A superconducting fault current limiter having at least two superconductor elements, each superconducting element having two ends, one end at the top and the other end at the bottom, said superconductor fault current limiter comprising;
   at least two superconducting elements electrically coupled together are substantially parallel to and disposed a generally fixed distance away from each other, wherein said at least two superconducting elements are electrically coupled at one end, such that when quenching occurs the resulting magnetic fields generated are additive in said at least two superconductors;
   at least one shunt coil coupled to the other end of said at least two superconductor elements, wherein said at least one shunt coil, wound as single or multilayer windings, is disposed outside of the magnetic field generated by said at least two superconductors;
   wherein the fault current limiter is adapted to generate a sufficient magnetic field to assist in quenching when a fault current flows using only the magnetic field generated by said at least two superconducting elements and not by said at least one shunt coil; and
   wherein said at least two superconducting elements are disposed in a circular, elliptical, and alternatively a rectangular shape to generate a generally uniform magnetic field generally orthogonal to said at least two superconducting elements.

2. The fault current limiter, as recited in claim 1, wherein each of said superconductors, is non and alternatively low-inductive form, is selected from the group including rods, bars, plates, tape strips, wires, tubes, bifilar coils and combinations thereof, made of at least one superconductor element connected in series or parallel, arranged in a way to form a rectangular, elliptical and alternatively a circular winding and produce a net magnetic field common to all elements.

3. The fault current limiter, as recited in claim 1, wherein said at least one shunt coil, wound as a single or multilayer windings, is made of electrically conductive materials in configurations that are selected from the group including helically-wound solenoid coils, racetrack coils, and saddle coils.

4. The fault current limiter, as recited in claim 1, arranged so that current is adapted to flow through said at least two superconductors in one end and out the other.

5. The fault current limiter, as recited in claim 1, wherein said at least one shunt coil, wound as a single or multiiayer windings, limits a voltage across said at least two superconducting elements during a fault condition.

6. A superconducting fault current limiter array having a plurality of superconductor elements, each superconductor element having an upper end and a lower end, said superconductor fault current limiter comprising;
   a meandering array comprising said plurality of superconductors, wherein said meandering array has an even number of superconductors parallel to each other and arranged in an even plane that is substantially parallel to an odd number of superconductors, and wherein said odd number of superconductors are substantially parallel to each other and arranged in an odd plane that is substantially parallel to said even number of superconductors, when viewed from a top view;
   wherein said even number of supcrconductors are coupled at an upper end to the upper end of said odd number of superconductors;
   a plurality of lower shunt coils each coupled to the lower end of each of said even number of superconductor elements;

a plurality of upper shunt coils each coupled to the upper end of each of said odd number of superconductor elements;

wherein said even and said odd superconducting elements are arranged in said even and odd planes to generate a substantially orthogonal uniform magnetic field.

7. The fault current limiter array. as recited in claim 6, wherein said upper and said plurality of lower shunt coils are disposed outside the magnetic field generated by said even and said odd numbered superconductor elements.

8. The fault current limiter array, as recited in claim 6, wherein each of said plurality of superconductor elements, in non and alternatively low-inductive form, is selected from the group including rods, bars, plates, tape strips, wires, tubes, bifilar coils and combinations thereof, made of at least one superconductor element connected in series or parallel, arranged in a way to form a rectangular, elliptical and alternatively a circular winding and produce a net magnetic field common to all elements.

9. The fault current limiter array, as recited in claim 6, wherein each of said plurality of shunt coils, wound as a single or multilayer windings, is made of electrically conductive materials in configurations that are selected from the group including helically-wound solenoid coils, racetrack coils, and saddle coils.

10. The fault current limiter array, as recited in claim 6, wherein said plurality of upper shunt coils comprises at least one single coil disposed on at least one single magnetic coupling element, said at least one single coil having tapped elements for each of said plurality of upper shunt coils.

11. The fault current limiter array, as recited in claim 6, further comprising:
a first fault current limiter array, having a plurality of superconductors comprising a first superconductor and a last superconductor, wherein current may flow into one end of said last superconductor and out of the other end of said first superconductor;
a second fault current limiter array having a plurality of superconductors comprising a first superconductor and a last superconductor, said second fault current limiter electrically coupled to said first fault current limiter array, having a configuration wherein current flows into one end of said last superconductor and out of the other end of said first superconductor; and
a barrier disposed between said first and said second array;
wherein said first array and said second array are arranged to generate a generally uniform magnetic field that is greater than any single magnetic field of either said first or said second array.

12. The fault current limiter array, as recited in claim 6, further comprising:
a first fault current limiter array, having a plurality of superconductors comprising a first superconductor and a last superconductor, wherein current may flow into one end of said last superconductor and out of the other end of said first superconductor;
a second fault current limiter array having a plurality of superconductors comprising a first superconductor and a last superconductor, said second array electrically coupled to said first fault current limiter array, having a configuration wherein current flows into one end of said first superconductor and out of the other end of said last superconductor; and
a barrier disposed between said first and said second array;

wherein said first array and said second array are arranged to generate a generally uniform magnetic field that is not greater than any single magnetic field of either said first or said second array.

13. A fault current limiter array having at least two superconductor elements wherein each superconductor element has an upper end and a lower end, said fault current limiter comprising:
at least one shunt coil electrically coupled to the upper end of said at least two superconductor elements;
said at least two superconductor elements electrically coupled at a respective lower end, such that when quenching occurs the resulting magnetic fields generated are additive in said at least two superconductors;
wherein said at least two superconducting elements are disposed substantially parallel to each other in a plane so that the magnetic field generated by said at least one shunt coil and said at least two superconductor elements do not interact with each other.

14. The fault current limiter array, as recited in claim 13, wherein each of said at least two superconductor elements, in non and alternatively low-inductive form, is selected from the group including rods, bars, plates, tape strips, tubes, bifilar coils and combinations thereof, made of at least one superconductor element connected in series or parallel, arranged in a way to form a rectangular, elliptical and alternatively a circular winding and produce a net magnetic field common to all elements.

15. The fault current limiter array, as recited in claim 13, wherein said at least one shunt coil is made of electrically conductive materials in configurations that are selected from the group including helically-wound solenoid coils, racetrack coils, and saddle coils.

16. A fault current limiter array, having a plurality of superconductor elements, said fault current limiter array comprising:
a plurality of upper and lower shunt coils;
wherein said plurality of superconductor elements is coupled together in in series sets of three;
each of said plurality of upper shunt coils electrically coupled in parallel to said first two superconducting elements in the set;
each of said plurality of lower shunt coils electrically coupled in parallel to said second two superconducting elements in the set;
wherein said line of superconducting elements are disposed parallel to each other in a plane so that the magnetic field generated by each respective superconductor genrates minimum electromagnetic force between respective superconductors.

17. The fault current limiter array, as recited in claim 16, wherein each of said superconductors, in non and alternatively low-inductive form, is selected from the group including rods. bars, plates, tape strips, tubes, bifilar coils and combinations thereof, made of at least one superconductor element connected in series or parallel, arranged in a way to form a rectangular, elliptical and alternatively a circular winding and produce a net magnetic field common to all elements.

18. The fault current limiter array, as recited in claim 16, wherein each of said plurality of shunt coils is made of electrically conductive materials in configurations that are selected from the group including helically-wound solenoid coils, racetrack coils, and saddle coils.

* * * * *